(12) United States Patent
Fujishima

(10) Patent No.: US 10,938,004 B2
(45) Date of Patent: Mar. 2, 2021

(54) BATTERY MODULE WITH STACK RESTRAINING MEMBER

(71) Applicant: TOYOTA JIDOSHA KABUSHIKI KAISHA, Toyota (JP)

(72) Inventor: Seigo Fujishima, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/223,369

(22) Filed: Dec. 18, 2018

(65) Prior Publication Data

US 2019/0229310 A1  Jul. 25, 2019

(30) Foreign Application Priority Data

Jan. 19, 2018  (JP) .............................. JP2018-007550

(51) Int. Cl.
| | | |
|---|---|---|
| *H01M 2/10* | (2006.01) | |
| *H01M 8/24* | (2016.01) | |
| *H01M 8/10* | (2016.01) | |
| *H01M 10/04* | (2006.01) | |
| *H01M 10/0525* | (2010.01) | |
| *H01M 10/48* | (2006.01) | |

(52) U.S. Cl.
CPC .......... *H01M 2/1077* (2013.01); *H01M 8/10* (2013.01); *H01M 8/24* (2013.01); *H01M 10/0481* (2013.01); *H01M 10/0525* (2013.01); *H01M 10/48* (2013.01); *H01M 2220/20* (2013.01)

(58) Field of Classification Search
CPC ........ H01M 2/1077; H01M 8/24; H01M 8/10; H01M 10/0481; H01M 10/0525; H01M 10/48; H01M 2220/20
USPC ........................................................ 429/99
See application file for complete search history.

(56) References Cited

U.S. PATENT DOCUMENTS

2017/0047562 A1*  2/2017  Ogawa ................ H01M 2/1022

FOREIGN PATENT DOCUMENTS

| JP | 2004-349052 A | | 12/2004 | |
|---|---|---|---|---|
| JP | 2009-187778 A | | 8/2009 | |
| JP | 2009-238606 A | | 10/2009 | |
| JP | 2016-004724 | * | 6/2014 | ............ H01M 10/04 |
| JP | 2016004724 A | | 1/2016 | |
| KR | 20170038300 A | | 4/2017 | |

* cited by examiner

*Primary Examiner* — Gary D Harris
(74) *Attorney, Agent, or Firm* — Dickinson Wright PLLC

(57) ABSTRACT

A displacement adjustment member provided in a battery module disclosed herein has at least a first elastic body and a second elastic body capable of undergoing elastic deformation in the stacking direction of unit cells. The first elastic body is made of an elastic body in which an elastic deformation extent, with respect to a predetermined load, is relatively larger than that of the second elastic body.

5 Claims, 4 Drawing Sheets

BATTERY MODULE WITH STACK RESTRAINING MEMBER

CROSS-REFERENCE TO RELATED APPLICATIONS

The present application claims priority to Japanese Patent Application No. 2018-007550 filed on Jan. 19, 2018, the entire contents whereof are incorporated into the present specification by reference.

BACKGROUND OF THE INVENTION

1. Field of the Invention

The present invention relates to a battery module (also referred to as battery pack and assembled battery). More particularly, the present invention relates to a battery module in which a plurality of unit cells is held in a restrained state.

2. Description of the Related Art

Battery modules provided with a plurality of unit cells in the form of secondary batteries such as lithium ion secondary batteries or nickel-hydride batteries have gained in importance as power sources for mounting in vehicles that are driven by electricity, and as power sources installed in electric appliances such as personal computers and portable terminals. In particular, battery modules that utilize unit cells in the form of lithium ion secondary batteries that are lightweight and boast high energy density are preferred as high-output power sources for vehicle drive in electric vehicles (EV), plug-in hybrid vehicles (PHV) and hybrid vehicles (HV), and the demand for such batteries is expected to further grow in the future.

In a typical configuration, such battery modules are provided with a stack (battery stack) resulting from stacking a plurality of unit cells of identical shape in a predetermined direction, the stack being restrained in a state of having a predetermined load applied thereto by a restraining member that restrains, in the stacking direction, the plurality of unit cells that make up the stack. For instance JP 2009-238606 A, which discloses a battery module of this type, describes a battery module provided with a pressure holding means for holding, within a predetermined range, the pressure that is applied to the stack in the stacking direction.

SUMMARY

Secondary batteries (unit cells) such as lithium ion secondary batteries that are charged and discharged at comparatively high C rates tend to exhibit comparatively large volume expansion/shrinkage when charged or discharged. In particular, so-called laminate-type batteries of flat shape in which an exterior body of the battery is made of a laminate film tend to exhibit significant volume expansion/shrinkage when charged or discharged. Volume differences between unit cells may also occur, on account of dimensional error, during production of the batteries. In other words, an error may arise in that the stacking-direction thickness of the plurality of unit cells when arrayed in the stacking direction does not match a design value. For this reason the restraining member provided in the battery module exhibits preferably a comparatively large dimensional displacement, so as to allow offsetting such volume expansion/shrinkage or thickness error. On the other hand, however, excessive expansion/shrinkage (variation) of the volume of the unit cells is undesirable in that it may result in alteration of the active material built into the battery (for instance in micronization of active material particles). From that point of view it is deemed that the dimensional displacement of the restraining member provided in the battery module is preferably comparatively small.

Therefore, the present invention was arrived at in order to resolve the above conflicting goals pertaining to restraining of a stack (group of stacked unit cells) of a battery module. It is an object of the present invention to provide a battery module provided with a restraining structure which, through setting of different degrees of dimensional displacement in the stacking direction, allows realizing displacement such that the above conflicting goals are attained.

In order to achieve the above goals, the battery module disclosed herein is provided with a stack in which a plurality of unit cells is stacked; a restraining member that restrains the stack by applying a load in the direction of the stacking; and a displacement adjustment member restrained in the stacking direction, together with the stack, by the restraining member, and being disposed at least at one site among a gap between any two unit cells in the stack, and a first end and a second end of the stack in the stacking direction.

In the battery module disclosed herein, the displacement adjustment member is provided with at least a first elastic body and a second elastic body capable of undergoing elastic deformation in the stacking direction. The first elastic body is made of an elastic body in which an elastic deformation extent, with respect to a predetermined load, is relatively larger than that of the second elastic body. The second elastic body is made of an elastic body in which the elastic deformation extent is relatively small.

In the battery module disclosed herein, when a reference length $X0$ is defined as a length of the stack in the stacking direction in a state in which the stack is restrained by the restraining member at a predetermined load in the stacking direction, a restraining load on the stack in the stacking direction is controlled through elastic deformation of the first elastic body when the stack expands from the reference length $X0$ up to a first length $X1$; and the restraining load on the stack in the stacking direction is controlled through elastic deformation of the second elastic body when the stack further expands from $X1$ up to a second length $X2$.

In a battery module having such a configuration, the displacement adjustment member is provided with the first elastic body and the second elastic body having mutually different elastic deformation extents, in other words having mutually different moduli of elasticity. As a result, when the thickness of several unit cells that make up the stack expands during use of the battery module (i.e. upon expansion of the stack containing the unit cells), the extent of expansion the stack, such as immediately after start of expansion, is relatively small, and the restraining load in the stacking direction is controlled through elastic deformation of the first elastic body exhibiting a relatively large elastic deformation extent (i.e. having a relatively small elastic modulus) with respect to a predetermined load, until the length in the stacking direction reaches $X1$ (mm) which is relatively close to the reference length $X0$. The thickness displacement amount of the stack (in other words the individual unit cells) in the stacking direction accompanying expansion of the stack can be made as a result comparatively large. The region from $X0$ up to $X1$ will be referred to hereafter as high displacement region.

Upon further expansion of the thickness of several unit cells that make up the stack, specifically, the restraining load in the stacking direction is controlled through elastic deformation of the second elastic body exhibiting a relatively small elastic deformation extent (i.e. having a relatively large elastic modulus) with respect to a predetermined load, until the length in the stacking direction reaches a predetermined X2 (mm) beyond the above X1 (mm). Accordingly, the thickness displacement amount of the stack (in other words, of the individual unit cells) accompanying expansion of the stack can be kept comparatively small at this stage. The region from X1 up to X2 will be hereafter referred to as low displacement region.

The battery module disclosed herein can thus address both a situation in which a comparatively large dimensional displacement is required so as to allow offsetting the volume expansion of the stack and/or thickness error, and a situation in which there is required a small comparative dimensional displacement to suppress excessive volume expansion of the stack, so as to preclude alteration of the active materials inside the unit cells (for instance micronization of active material particles).

In a preferred implementation of the battery module disclosed herein, the first elastic body is made of a spring, and the second elastic body is made of a metal, an alloy, a rubber or a synthetic resin. A battery module having such a configuration allows easily bringing about an elastic deformation extent (elastic modulus) between the first elastic body and the second elastic body, so as to attain the above goal.

In a particularly preferred implementation of the battery module disclosed herein, the displacement adjustment member is provided with a plate adjacent to the first elastic body and the second elastic body, the first elastic body deforms elastically through abutting of the first elastic body against the plate when the length of the stack in the stacking direction is from X0 to X1, and the second elastic body deforms elastically through abutting of the second elastic body against the plate when the length of the stack in the stacking direction is from X1 to X2. In a battery module having such a configuration, the main agent of elastic deformation switches over from the first elastic body to the second elastic body at X1; as a result, the length of the stack in the stacking direction can reliably include the high displacement region from the reference length X0 up to a predetermined X1 (mm), and the low displacement region from X1 up to a predetermined X2 (mm).

In another preferred implementation of the battery module disclosed herein, the displacement adjustment member is further provided with a third elastic body. The third elastic body is made of an elastic body exhibiting an elastic deformation extent, with respect to a predetermined load, that is relatively smaller than those of both the first and second elastic bodies. Herein, the restraining load on the stack in the stacking direction is controlled through elastic deformation of the third elastic body from X2 when the stack further expands from X2 up to a third length X3. In a battery module having such a configuration an ultra-low displacement region can thus be further provided, in addition to the high displacement region and the low displacement region, and hence the restraining load can be controlled yet more precisely.

BRIEF DESCRIPTION OF THE DRAWINGS

FIG. 2A is a top-view diagram of a face of a unit cell at which positive and negative electrodes terminals are exposed, FIG. 2B is a front-view diagram illustrating a wide flat surface of a unit cell, and FIG. 2C is a side-view diagram illustrating the thickness of a unit cell;

DETAILED DESCRIPTION OF THE PREFERRED EMBODIMENTS

Figure 1:
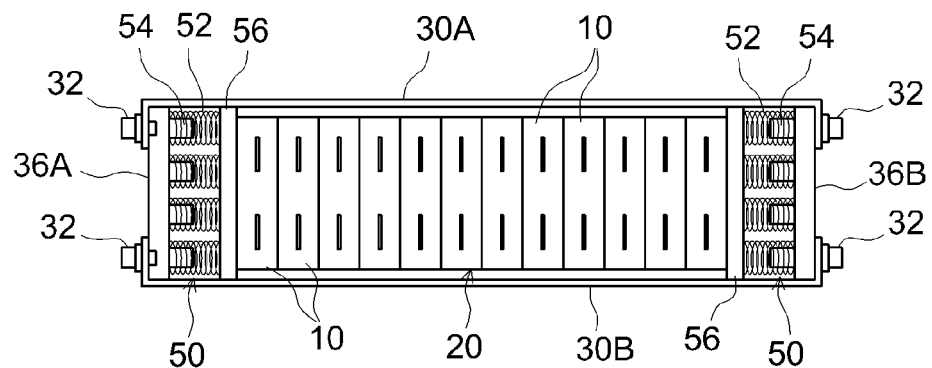
FIG. 1 is a plan-view diagram illustrating schematically the structure of a battery module according to an embodiment.

Embodiments of the present invention will be explained below with reference to accompanying drawings. In the drawings explained below, members and portions eliciting identical effects are denoted by identical reference symbols, and a recurrent explanation thereof may be omitted or simplified. The dimensional relationships (length, width, thickness and so forth) in the figures do not reflect actual dimensional relationships. Any features other than the matter specifically set forth in the present specification and that may be necessary for carrying out the present invention can be regarded as instances of design matter, for a person skilled in the art, based on known techniques in the relevant technical field.

FIG. 1 is a plan-view diagram illustrating schematically the structure of a battery module 100 according to an embodiment. In the battery module 100 according to the present embodiment, as illustrated in the figure, a stack 20 (battery stack) is constructed through stacking (arraying) of a plurality of unit cells 10 in a predetermined direction, with respective displacement adjustment members 50 having the configuration described below being disposed at both ends of the stack 20 in the stacking direction. The two displacement adjustment members 50 are formed by being restrained, together with the stack 20, in a state where a load is applied in the stacking direction. The configuration of the battery module 100 according to the present embodiment will be explained in detail next.

Figure 2:
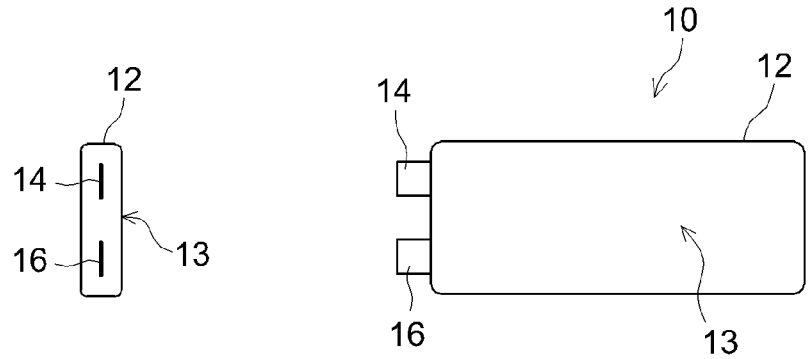
FIGS. 2A to 2C are diagrams for explaining the shape of unit cells provided in the battery module according to an embodiment, where
Figure 2:
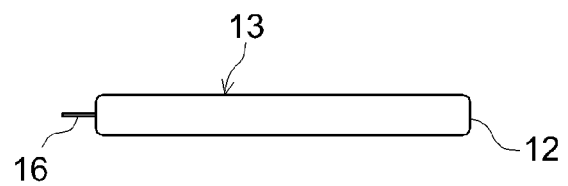

As depicted in FIGS. 2A to 2C, the unit cells 10 according to the present embodiment have a configuration wherein, similarly to unit cells provided in conventional ordinary battery modules, a flat electrode body (not shown) having predetermined battery constituent materials (sheet-shaped electrodes, separators and so forth in which respective active materials of positive and negative electrodes are held on collectors of positive and negative electrodes) is accommodated, together with an appropriate electrolyte, in an exterior body 12 corresponding to a container having a shape (having a flat rectangular parallelepiped shape, i.e. an angular shape, such as the one illustrated in the figures) capable of accommodating the electrode body.

The material that constitutes the exterior body 12 is not particularly limited, and for instance may be the same as materials used in typical unit cells. For instance there can be preferably used a metal-made (for example aluminum-made) exterior body 12, from the viewpoint of achieving high physical strength and heat dissipation properties in the unit cells 10. Alternatively, the exterior body 12 may be made of a laminate film, in terms of stackability and reduction of the weight of the module as a whole. Preferred examples of such an instance include a laminate film having a three-layer structure in which a metal layer is disposed between two synthetic resin layers. On the top face of the exterior body 12 there are provided a positive electrode terminal 14 and a negative electrode terminal 16 electrically connected to the positive electrode and the negative electrode, respectively, of the electrode body in the interior.

The unit cells 10 may be fuel cells or secondary batteries such as nickel-hydride batteries, but are preferably lithium ion secondary batteries. The lithium ion secondary batteries can be typically a nonaqueous electrolyte lithium ion secondary battery, where the electrolyte of the battery is a nonaqueous electrolyte solution, or an all-solid-state lithium ion secondary battery in which the electrolyte is solid. All-solid-state lithium ion secondary batteries are problematic in that the internal resistance of the battery is comparatively high, since all of the positive electrode, the negative electrode and the electrolyte are solid. In a case where the stack 20 is formed using all-solid-state lithium ion secondary batteries as the unit cells 10, it is important therefore to properly secure a restraining load in the stacking direction. Although depending also on the positive and negative electrode materials that are used, all-solid-state lithium ion secondary batteries tend to exhibit a greater degree of expansion and shrinkage, accompanying charging and discharge, than nonaqueous electrolyte lithium ion secondary batteries. From this viewpoint as well it is important to properly secure a restraining load in the stacking direction. All-solid-state lithium ion secondary batteries are thus suitable as unit cells in which the art disclosed herein is adopted. Materials and members conventionally utilized can be used, without particular limitations, as the materials and members that make up the unit cells in an all-solid-state lithium ion secondary battery, a lithium ion secondary battery of some other form (typically a lithium ion secondary battery provided with an nonaqueous electrolyte solution), or secondary batteries other than lithium ion secondary batteries. The internal configuration itself of the unit cells is not a characterizing feature of the present invention, and accordingly there will follow no further detailed explanation of the unit cells.

Figure 3:
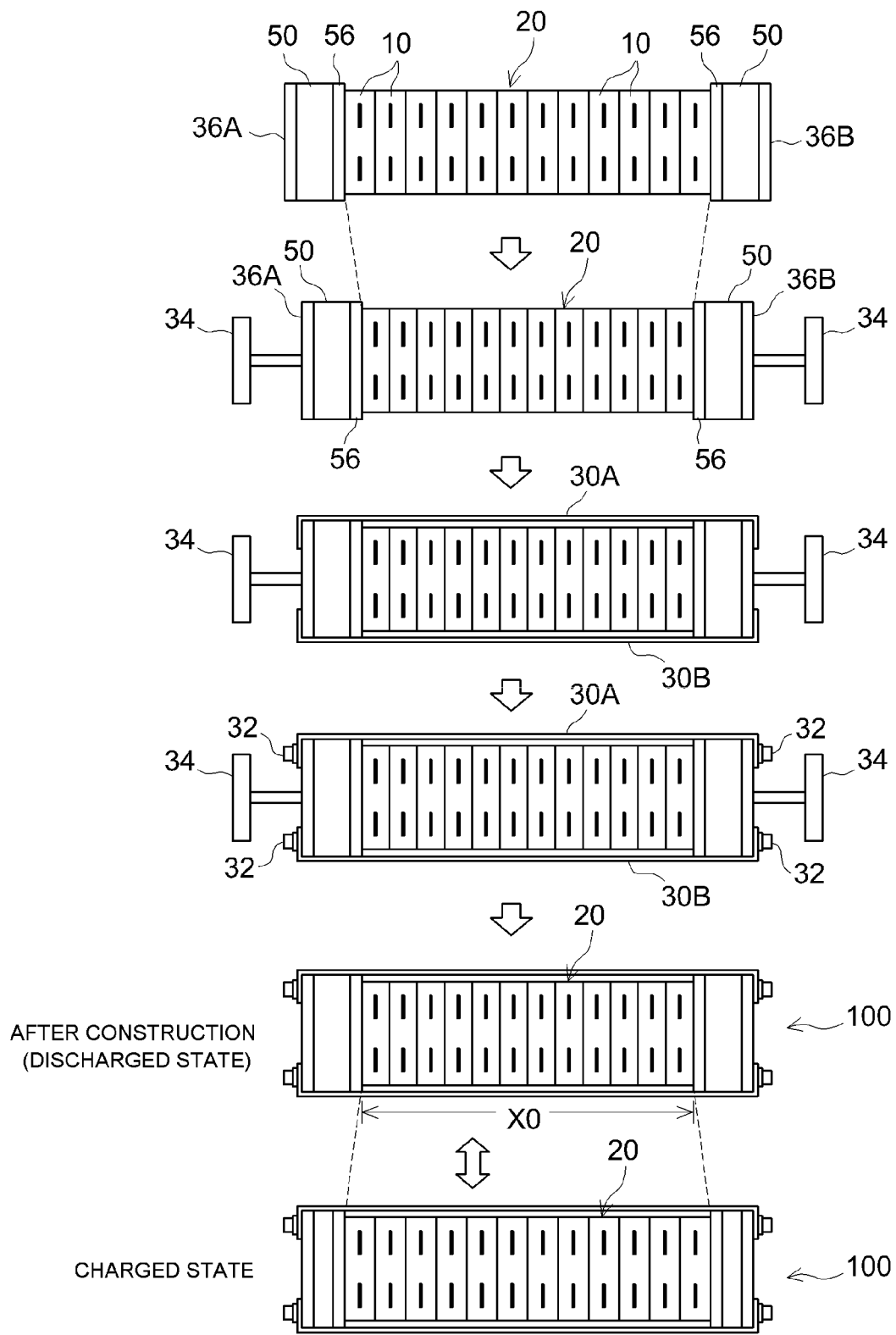
FIG. 3 is a diagram for explaining a construction flow and restraining structure of a battery module according to an embodiment.

The battery module 100 according to the present embodiment can be constructed similarly to conventional battery modules of this type. Specifically, as illustrated in FIG. 3, firstly a predetermined number of unit cells 10 are stacked so that wide respective flat surfaces 13 of the unit cells 10 oppose each other, to construct the stack 20. Respective displacement adjustment members 50 according to the present embodiment and having the configuration described below are disposed at both ends of the stack in the stacking direction. In this state a predetermined restraining load is applied in the stacking direction by predetermined compression jigs 34. A pair of restraining members (side plates) 30A, 30B for collectively restraining the displacement adjustment members 50 and the stack 20 are attached to both side faces of the stack 20 and the displacement adjustment members 50. At the same time, end plates 36A, 36B are attached so as to bridge over the pair of restraining members (side plates) 30A, 30B. The stack 20 and the displacement adjustment members 50 can be fixed, in a state where a predetermined restraining load acts thereon, through fastening of the ends of the end plates 36A, 36B by fastening members (for instance bolts and nuts) 32. The compression jigs 34 can be removed after fixing of the stack 20 and the displacement adjustment members 50.

As a result of this series of processes, the stack 20 can be restrained together with the pair of displacement adjustment members 50 in a state where a predetermined restraining load acts in the stacking direction, in other words, in a state where the length of the stack 20 (i.e. the plurality of unit cells 10) in the stacking direction is a reference length X0 (mm) set beforehand. The magnitude of the restraining load herein may vary depending on the properties of the unit cells 10, and hence is not particularly limited, but typically the stack 20 and the displacement adjustment members 50 are restrained so that the surface pressure on the flat surface 13 of the stacked unit cells 10 is about $10^4$ Pa to $10^6$ Pa. The positive and negative electrodes of the plurality of unit cells 10 that make up the stack 20 are electrically connected in series by respective predetermined connectors (not shown), to thereby construct the target battery module 100.

Figure 4:
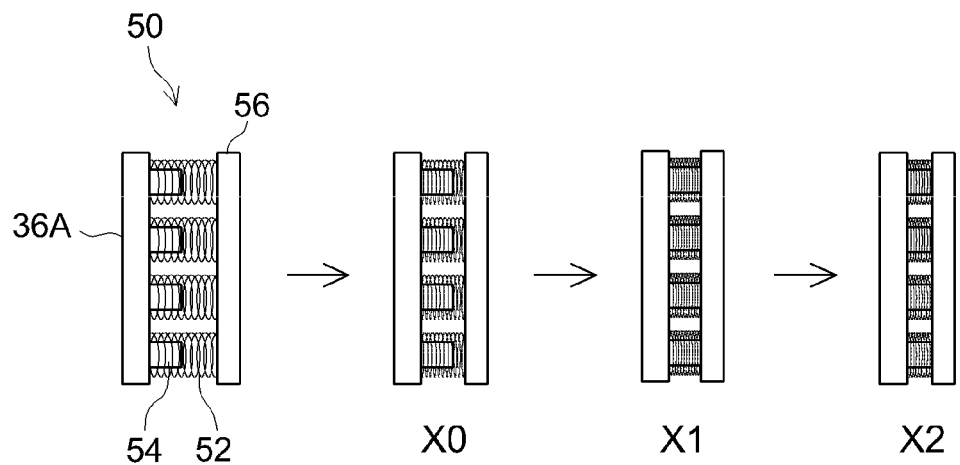
FIG. 4 is a diagram for explaining the structure and operation mode of a displacement adjustment member according to an embodiment.

The configuration and effect of the displacement adjustment members 50 according to the present embodiment will be explained next with reference to accompanying drawings. As illustrated in FIGS. 1 and 4, the displacement adjustment members 50 according to the present embodiment are provided with a plurality of coil springs 52 made of metal, as a first elastic body, and a plurality of elastic columnar bodies 54 made of metal, an alloy, rubber or a synthetic resin, as a second elastic body. As illustrated in the figures, the coil springs 52 and the elastic columnar bodies 54 are disposed so that compression and elongation (in other words, an elastic force) is generated in the stacking direction of the stack 20, in response to the restraining load. In the present embodiment, as illustrated in the figures, respective base plates 56 are disposed at the ends of the stack 20, i.e. are disposed between the displacement adjustment members 50 and the flat surface 13 of the unit cells 10 disposed at the ends in the stacking direction, among the plurality of unit cells 10 that constitute the stack 20. As a result, the coil springs 52 and the elastic columnar bodies 54 exert indirectly elastic forces onto the stack 20 via the base plates 56. Therefore, an elastic force can be exerted onto the entire flat surface 13 of the unit cells 10 more uniformly than in the case of direct contact between the coil springs 52 or the elastic columnar bodies 54 with the flat surface 13 of the unit cells 10. The material of the coil springs 52 and of the elastic columnar bodies 54 is not particularly limited, so long as the material has a desired elastic modulus, and the coil springs 52 and the elastic columnar bodies 54 can be formed out of various materials. For instance a spring formed out of various metallic materials or steel materials can be used as the coil springs 52. For instance a body formed out of a rubber or elastomer material such as natural rubber, butadiene styrene rubber, butadiene acrylonitrile rubber or butyl rubber, or a synthetic resin material such a urethane resin, a polyisobutylene resin, a polyethylene resin, an ethylene-vinyl acetate copolymer or a silicone resin can be used as the elastic columnar bodies 54. Alternatively, the elastic columnar bodies 54 may be made of various metals (for instance iron) or an alloy (for instance steel) containing that metal. In a preferred embodiment in this case, elastic columnar bodies 54 of the same material are integrally formed at part of end plates 36A, 36B made up for instance of iron or a steel material.

In the displacement adjustment members 50 according to the present embodiment, as illustrated in FIG. 4, the coil springs (first elastic body) 52 have a greater total length, in the stacking direction, than that of the elastic columnar bodies 54. Accordingly, only the coil springs 52 abut the base plates 56, while the elastic columnar bodies 54 do not, when there is constructed a battery module 100 in which a predetermined restraining load is exerted, such as the one illustrated in FIG. 3, i.e. when the length of the stack 20 in the stacking direction is a reference length X0 (mm). As a result it becomes possible to control the length of the stack 20 in the stacking direction and the restraining load in the stacking direction, through elastic deformation of the coil springs 52, when the stack 20 begins to expand (stretch) in the stacking direction, for instance at the time of full charge of the battery module 100 after construction.

As illustrated in FIG. 4, however, the restraining load on the stack 20 in the stacking direction can be controlled mainly through elastic deformation of the elastic columnar bodies 54, from the point in time at which the elastic columnar bodies 54 finally abut the base plates 56 when upon further expansion (elongation) of the stack 20 in the stacking direction until the length of stack in the stacking becomes a predetermined first length X1 (mm), typically until the restraining load reaches an upper limit or until the length of the stack 20 in the stacking direction reaches an upper limit-length (for convenience referred to as X2 (mm) in the present embodiment).

In the battery module 100 according to the present embodiment, therefore, the adjustment amount of the restraining load or the elastic deformation extent of the displacement adjustment members 50 can be caused to vary, from the reference length X0 until X1 is reached, and from X1 until X2 is reached, during the process of expansion of the stack 20, such as during charging.

The design in the present embodiment is such that the elastic modulus of the coil springs 52 is relatively small and the elastic modulus of the elastic columnar bodies 54 is relatively large. As a result a suitable high displacement region and low displacement region can be set to be continuous, accompanying the expansion of the stack 20, as illustrated schematically in the graph of FIG. 5. As FIG. 5 indicates, the restraining load on the stack 20 in the stacking direction is controlled through elastic deformation of the coil springs 52, having a relatively small elastic modulus, from the point in time at which the length of the stack 20 in the stacking direction becomes the reference length X0 until the length is X1, and accordingly there is formed a high displacement region of comparatively high expansion rate (elongation rate) of the stack 20 per unit increment of the restraining load (kN). Accordingly, a comparatively large dimensional displacement can be tolerated, without excessive increase in restraining load, such that volume expansion and variability in the thickness of the stack 20 can be buffered.

Figure 5:
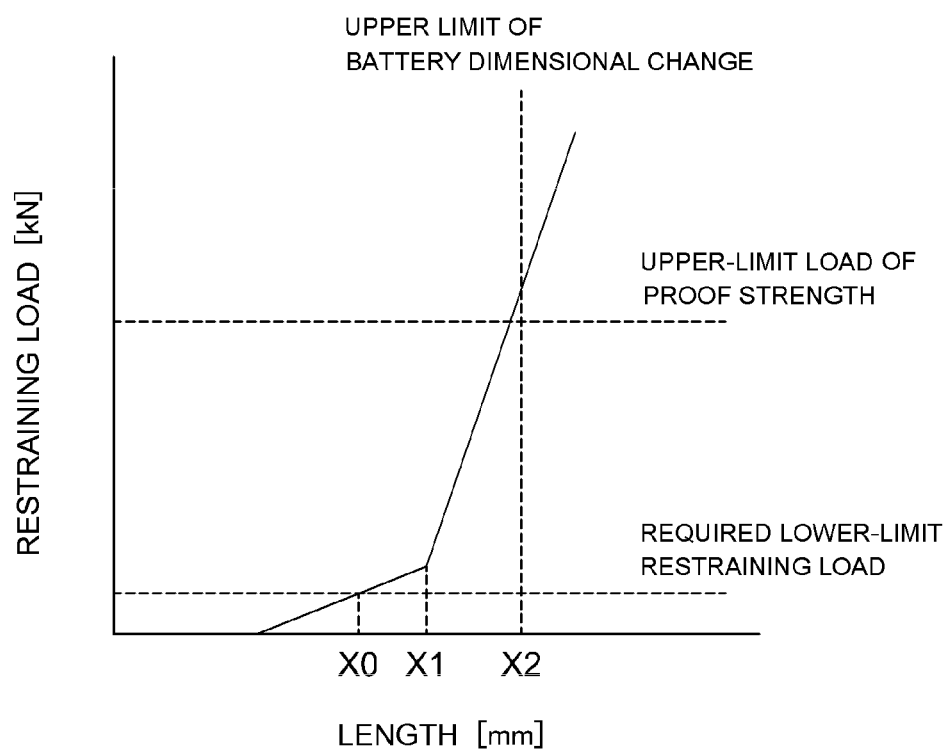
FIG. 5 is a graph for explaining a relationship between stacking direction length and restraining load in a stack of a battery module according to an embodiment.

As illustrated in FIG. 5, the restraining load on the stack 20 in the stacking direction is mainly controlled through elastic deformation of the elastic columnar bodies 54 having relatively large elastic modulus, at the point in time at which the length of the stack 20 in the stacking direction exceeds X1 (and typically up to X2). Accordingly, a low displacement region is formed of comparatively low expansion rate (elongation rate) of the stack 20 per unit increment of the restraining load (kN). In this region, excessive volume expansion of the stack is suppressed so as to preclude alteration (for instance micronization of active material particles) of the active material contained inside the unit cells 10 that make up the stack 20.

A preferred embodiment of the displacement adjustment members 50 provided with the first elastic body (coil springs 52) and the second elastic body (elastic columnar bodies 54) having mutually different elastic moduli has been explained above. However, the displacement adjustment members 50 provided in the battery module 100 disclosed herein are not limited to the embodiment above, and it suffices that there be used two types of elastic body having mutually different elastic moduli (elastic deformation extent); and, for instance, the first elastic body may be a an elastic columnar body having a small elastic modulus and being made of a synthetic resin or rubber, while the second elastic body may be a spring having a large elastic modulus.

The displacement adjustment members of the first embodiment are the displacement adjustment members 50 that allow realizing two displacement regions i.e. a high displacement region and a low displacement region, but for instance the art disclosed herein allows causing an elastic deformation region to be different over three stages. As another embodiment, displacement adjustment members 150, 250 that allow causing an elastic deformation region to be different over three stages will be explained next with reference to FIGS. 6 and 7. In these figures only characterizing portions of the displacement adjustment members 150, 250 are described schematically. The sites at which the displacement adjustment members 150, 250 are disposed and other features of the battery module are identical to those in the first embodiment described above (FIGS. 1 to 3).

Figure 6:
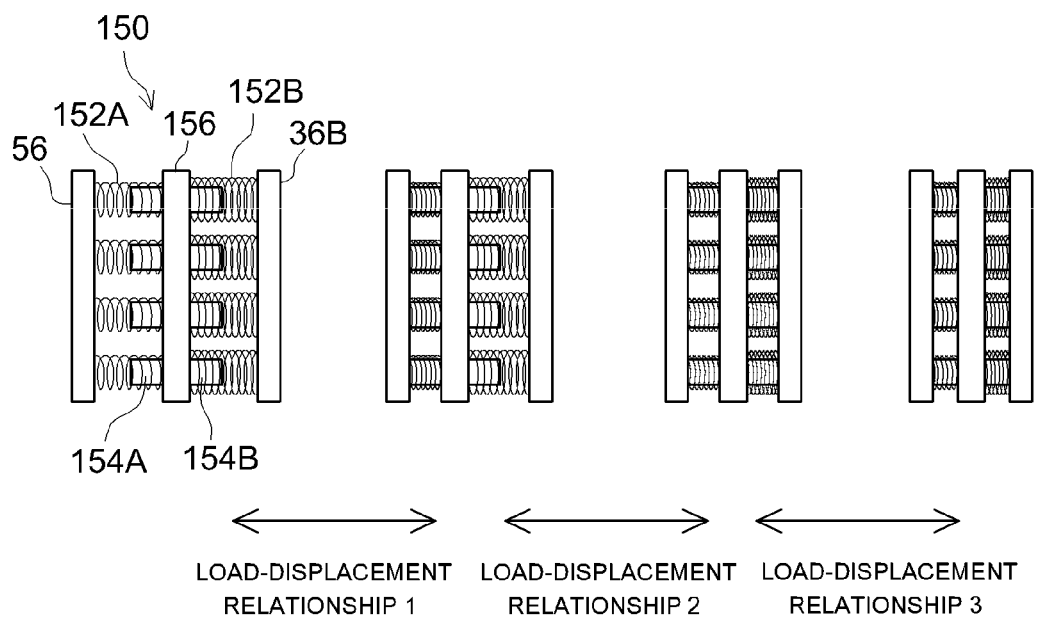
FIG. 6 is a diagram for explaining the structure and operation mode of a displacement adjustment member according to another embodiment.

Each displacement adjustment member 150 in the second embodiment illustrated in FIG. 6, being a respective displacement adjustment member 150 disposed between one of the base plates 56 (see FIG. 1) and a respective end plate 36A, 36B (see FIG. 1), is provided with two types of coil springs 152A, 152B having spring constants which are different from each other, and elastic columnar bodies 154A, 154B having larger elastic modulus than those of two types of coil springs 152A, 152B, similarly to the first embodiment, the elastic columnar bodies 154A, 154B being respectively formed on both faces of the intermediate plate 156, as illustrated in the figure, to equal length in the stacking direction. The two types of coil springs 152A, 152B are separately provided independently from each other at two respective spaces demarcated by the intermediate plate 156. In the figure, the coil springs 152A of relatively smaller spring constant (elastic modulus) are disposed between the intermediate plate 156 and the base plate 56, and the coil springs 152B of relatively larger spring constant (elastic modulus) are disposed between the intermediate plate 156 and the end plate 36B. However this is merely an example, and the arrangement site of the two types of coil springs 152A, 152B may be the reverse of that illustrated in the figure.

By virtue of the above configuration, in the displacement adjustment members 150 according to the present embodiment the restraining load on the stack in the stacking direction is controlled through elastic deformation of the coil springs 152A having relatively smaller spring constant (elastic modulus), from the point in time at which the length of the stack in the stacking direction becomes the reference length X0 until the length reaches the length X1 at which the elastic columnar bodies 154A abut the base plate 56. Accordingly, there is formed a high displacement region (load-displacement relationship 1 in the figure) of comparatively high expansion rate (elongation rate) of the stack per unit increment of the restraining load (kN).

Next, the restraining load on the stack in the stacking direction is controlled through elastic deformation of the coil springs 152B having relatively large spring constant (elastic modulus), from the point in time at which the length of the stack in the stacking direction becomes X1 until the length is the length X2 at which the elastic columnar bodies 154B abut the end plate 36B. Accordingly, a low displacement region (load-displacement relationship 2 in the figure) is formed at which the expansion rate (elongation rate) of the stack per unit increment of the restraining load (kN) is smaller than that in the high displacement region.

Once the length of the stack in the stacking direction exceeds X2, further, the restraining load on the stack in the stacking direction is controlled through elastic deformation of the elastic columnar bodies 152A, 152B having largest elastic modulus, typically from the point in time at which the restraining load reaches an upper limit or until the length of the stack in the stacking direction reaches an upper-limit length (for convenience X3 (mm) in the present embodiment). In this region there is formed an ultra-low displacement region (load-displacement relationship 3 in the figure) in which the expansion rate (elongation rate) of the stack per unit increment of the region is yet smaller than that in the low displacement region. In the displacement adjustment members 150 according to the present embodiment, as described above, a displacement region can be set to be different over three stages, and as a result a battery module provided with the displacement adjustment members 150 having such a configuration allows controlling the restraining load more precisely.

Figure 7:
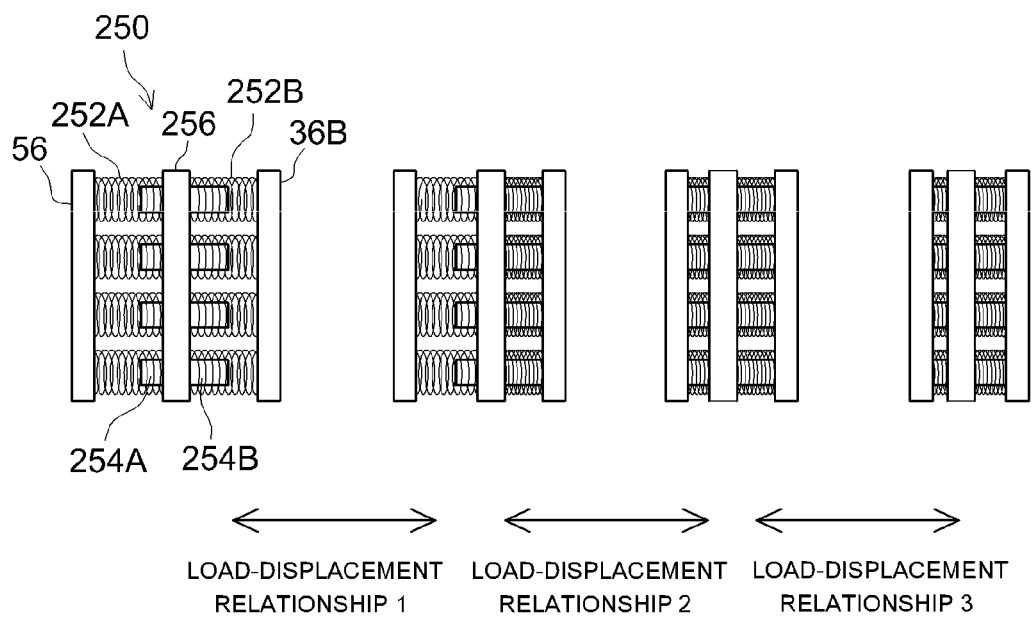
FIG. 7 is a diagram for explaining the structure and operation mode of a displacement adjustment member according to another embodiment.

Each displacement adjustment member 250 in a third embodiment illustrated in FIG. 7, being a respective displacement adjustment member 250 disposed between one of the base plates 56 and a respective end plate 36A, 36B (see FIG. 1), is provided with coil springs 252A, 252B having a predetermined spring constant, and two types of elastic columnar bodies 254A, 254B having larger elastic modulus than that of two coil springs 252A, 252B. The coil springs 252A, 252B are respectively provided in the two spaces demarcated by an intermediate plate 256. The elastic columnar bodies 254A, 254B are respectively formed on the two faces of the intermediate plate 256, as illustrated in the figures. In the present embodiment, the stacking-direction length of the elastic columnar bodies 254A formed on the face of the intermediate plate 256 opposing the base plate 56 is set to be shorter than the stacking-direction length of the elastic columnar bodies 254B formed on the face of the intermediate plate 256 opposing the end plate 36B. Hereafter the elastic columnar bodies 254A will be referred to as short elastic columnar bodies 254A and the elastic columnar bodies 254B as long elastic columnar bodies 254B.

The short elastic columnar bodies 254A in the present embodiment are formed to have a relatively larger elastic modulus than that of the long elastic columnar bodies 254B. That is, the coil springs 252A, 252B, the long elastic columnar bodies 254B and the short elastic columnar bodies 254A are formed in that ascending order of elastic modulus.

By virtue of the above configuration, in the displacement adjustment members 250 according to the present embodiment, the restraining load on the stack in the stacking direction is controlled through elastic deformation of the coil springs 252A, 252B from the point in time at which the length of the stack in the stacking direction becomes the reference length X0 until the length reaches the length X1 at which the long elastic columnar bodies 254B abut the end plate 36B. Accordingly, there is formed a high displacement region (load-displacement relationship 1 in the figure) of comparatively high expansion rate (elongation rate) of the stack per unit increment of the restraining load (kN). Next, the restraining load on the stack in the stacking direction is controlled through elastic deformation of the long elastic columnar bodies 254B having relatively smaller elastic modulus, in addition to through elastic deformation of the coil springs 252A, from the point in time at which the length of the stack in the stacking direction is X1 until the length becomes the length X2 at which the short elastic columnar bodies 254A abut the base plate 56. Accordingly, a low displacement region (load-displacement relationship 2 in the figure) is formed at which the expansion rate (elongation rate) of the stack per unit increment of the restraining load (kN) is smaller than that in the high displacement region.

Once the length of the stack in the stacking direction exceeds X2, the restraining load on the stack in the stacking direction is controlled mainly through elastic deformation of the short elastic columnar bodies 252A having largest elastic modulus, typically from the point in time at which the restraining load reaches an upper limit or until the length of the stack in the stacking direction reaches an upper-limit length (for convenience X3 (mm) in the present embodiment). In this region there is formed an ultra-low displacement region (load-displacement relationship 3 in the figure) in which the expansion rate (elongation rate) of the stack per unit increment of the restraining load on the stack in the stacking direction is yet smaller than that in the low displacement region. As described above, also in the configuration of the displacement adjustment members 250 according to the present embodiment a displacement region can be made different over three stages, similarly to the case the second embodiment, and as a result a battery module provided with the displacement adjustment members 250 having such a configuration allows controlling the restraining load more precisely.

Concrete examples of the present invention have been explained in detail above, but the examples are merely illustrative in nature, and are not meant to limit the scope of the claims in any way. The features set forth in the claims can accommodate various modifications and alterations of the concrete examples illustrated above. For instance, the sites at which the displacement adjustment members are disposed are not limited to the ends of the stack in the stacking direction, and may be gaps between any two unit cells in the stack.

The battery module and the displacement adjustment members as illustrated in the figures have a simple structure for the purpose of explanation of the present invention, but it will be apparent to a person skilled in the art that all manner of variations can be adopted, and various devices can be added, without detriment to the constitution and the effect of the invention. The battery module disclosed herein is suitable for use, as a power source for motor drive, by being installed in a vehicle such as an electric vehicle (EV), a hybrid vehicle (HV) or a plug-in hybrid vehicle (PHV) from which particularly high battery performance is demanded.

What is claimed is:
1. A battery module, comprising:
a stack in which a plurality of unit cells is stacked;
a restraining member that restrains the stack by applying a load in the direction of the stacking; and
a displacement adjustment member restrained in the stacking direction, together with the stack, by the restraining member, and being disposed at least at one site among a gap between any two unit cells in the stack, and a first end and a second end of the stack in the stacking direction;

wherein the displacement adjustment member is provided with at least a first elastic body and a second elastic body capable of undergoing elastic deformation in the stacking direction;

the first elastic body is made of an elastic body in which an elastic deformation extent, with respect to a predetermined load, is relatively larger than that of the second elastic body, and the second elastic body is made of an elastic body in which the elastic deformation extent is relatively small;

a restraining load on the stack in the stacking direction is controlled through elastic deformation of the first elastic body when the stack expands from a reference length $X0$, which is a length of the stack in the stacking direction in a state in which the stack is restrained by the restraining member at a predetermined load in the stacking direction, up to a first length $X1$, and the restraining load on the stack in the stacking direction is controlled through elastic deformation of the second elastic body when the stack further expands from $X1$ up to a second length $X2$.

2. The battery module of claim 1, wherein the first elastic body is made of a spring, and the second elastic body is made of a metal, an alloy, a rubber or a synthetic resin.

3. The battery module of claim 1, wherein the displacement adjustment member is provided with a plate adjacent to the first elastic body and the second elastic body; and the first elastic body deforms elastically by abutting of the first elastic body against the plate when the length of the stack in the stacking direction is from $X0$ up to $X1$, and the second elastic body deforms elastically by abutting of the second elastic body against the plate when the length of the stack in the stacking direction is from $X1$ up to $X2$.

4. The battery module of claim 1, wherein the displacement adjustment member is further provided with a third elastic body, the third elastic body being made of an elastic body exhibiting an elastic deformation extent, with respect to a predetermined load, that is relatively smaller than those of both the first and second elastic bodies; and the restraining load on the stack in the stacking direction is controlled through elastic deformation of the third elastic body when the stack further expands from $X2$ up to a third length $X3$.

5. The battery module of claim 3, wherein the displacement adjustment member is further provided with a third elastic body, the third elastic body being made of an elastic body exhibiting an elastic deformation extent, with respect to a predetermined load, that is relatively smaller than those of both the first and second elastic bodies; and the restraining load on the stack in the stacking direction is controlled through elastic deformation of the third elastic body when the stack further expands from $X2$ up to a third length $X3$.

\* \* \* \* \*